US009786280B2

(12) United States Patent
Alves et al.

(10) Patent No.: US 9,786,280 B2
(45) Date of Patent: *Oct. 10, 2017

(54) METHODS AND APPARATUS FOR VOICE-CONTROLLED ACCESS AND DISPLAY OF ELECTRONIC CHARTS ONBOARD AN AIRCRAFT

(71) Applicant: HONEYWELL INTERNATIONAL INC., Morris Plains, NJ (US)

(72) Inventors: Erin Elizabeth Alves, Peoria, AZ (US); Robert E De Mers, Nowthen, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,779

(22) Filed: Mar. 3, 2017

(65) Prior Publication Data

US 2017/0178629 A1 Jun. 22, 2017

Related U.S. Application Data

(63) Continuation of application No. 14/542,911, filed on Nov. 17, 2014, now Pat. No. 9,600,230.

(51) Int. Cl.
*G06F 3/16* (2006.01)
*G10L 15/22* (2006.01)
(Continued)

(52) U.S. Cl.
CPC .............. *G10L 15/22* (2013.01); *G06F 3/167* (2013.01); *G08G 5/0021* (2013.01);
(Continued)

(58) Field of Classification Search
CPC .... G08G 5/0021; G08G 5/0047; G10L 15/22; G06F 3/167
See application file for complete search history.

(56) References Cited

U.S. PATENT DOCUMENTS 6,606,544 B2    8/2003  Glenn, III et al.
2002/0165647 A1* 11/2002  Glenn, III ............. G06F 9/4443
                                                    701/3
(Continued)

FOREIGN PATENT DOCUMENTS

EP      2645065 A2    10/2013
EP      2793206 A2    10/2014
WO      2011027032 A1  3/2011

OTHER PUBLICATIONS

Tuccio, W.A.; Aviation Approach Charts in an iPad World; The Journal of Navigation (2013), 66, 135-147. The Royal Institute of Navigation 2012.
(Continued)

*Primary Examiner* — Anil Bhargava
(74) *Attorney, Agent, or Firm* — Lorenz & Kopf, LLP

(57) ABSTRACT

A method for accessing electronic charts stored on an aircraft is provided. The method receives, via an onboard avionics system, location data for the aircraft; receives a set of speech data via a user interface of the aircraft; identifies one or more applicable electronic charts, based on the received location data and the received set of speech data, wherein the electronic charts stored on the aircraft comprise at least the one or more applicable electronic charts; and presents, via an aircraft display, a first one of the one or more applicable electronic charts.

20 Claims, 9 Drawing Sheets

(51) Int. Cl.
*G10L 25/54* (2013.01)
*G08G 5/00* (2006.01)

(52) U.S. Cl.
CPC ............ *G08G 5/0047* (2013.01); *G10L 25/54* (2013.01); *G10L 2015/223* (2013.01)

(56) References Cited

U.S. PATENT DOCUMENTS

| | | | | |
|---|---|---|---|---|
| 2007/0106510 | A1* | 5/2007 | Hsing | G06Q 50/24 704/246 |
| 2007/0288128 | A1* | 12/2007 | Komer | G10L 15/26 701/3 |
| 2008/0215193 | A1* | 9/2008 | Hanson | G01C 23/00 701/3 |
| 2013/0035848 | A1* | 2/2013 | Burgin | G09B 5/06 701/415 |
| 2013/0066486 | A1* | 3/2013 | Gurusamy | G05D 1/0661 701/7 |

OTHER PUBLICATIONS

Honeywell Aerospace; NextGen Flight Deck Information Displays, Recommendations for Managing Display complexity with Electronic Chart Information; Instrument Procedures R&D Plan Section 5: Electronic Charts, Task 7—Instrument Procedures; Feb. 2014.
Nield, D.; How to Customise the Kindle Fire HD's Carousel and Favourites; Feb. 8, 2013.
Extended EP Search Report for Application No. 15193924.6 1901 dated Mar. 31, 2016.

\* cited by examiner

METHODS AND APPARATUS FOR VOICE-CONTROLLED ACCESS AND DISPLAY OF ELECTRONIC CHARTS ONBOARD AN AIRCRAFT

CROSS-REFERENCE TO RELATED APPLICATION(S)

This application is a continuation of U.S. patent application Ser. No. 14/542,911, filed Nov. 17, 2014.

TECHNICAL FIELD

Embodiments of the subject matter described herein relate generally to retrieving one or more electronic charts onboard an aircraft using speech recognition (SR) technology. More particularly, embodiments of the subject matter relate to voice controlled electronic chart retrieval based on location data for the aircraft.

BACKGROUND

Aircraft generally use electronic charts for providing a flight crew member with information specific to a particular route and/or airport. Electronic charts may include airport maps, intersections and taxiways data, and procedures and data associated with approach, arrival, and departure. Conventional interfaces for electronic charts make use of physical interaction devices (CCDs, knobs, etc.), and flight crew members must navigate multiple menus and levels of accessibility to gain access to a necessary chart. Commonly, flight crew members must access the devices while under a great deal of cognitive and physiological workload during flight—particularly during takeoff and landing phases.

Accordingly, it is desirable to provide a mechanism for accessing charts easily and quickly, without the need for complicated and/or lengthy menu selection systems. Furthermore, other desirable features and characteristics will become apparent from the subsequent detailed description and the appended claims, taken in conjunction with the accompanying drawings and the foregoing technical field and background.

BRIEF SUMMARY

Some embodiments of the present invention provide a method for accessing electronic charts stored on an aircraft. The method receives, via an onboard avionics system, location data for the aircraft; receives a set of speech data via a user interface of the aircraft; identifies one or more applicable electronic charts, based on the received location data and the received set of speech data, wherein the electronic charts stored on the aircraft comprise at least the one or more applicable electronic charts; and presents, via an aircraft display, a first one of the one or more applicable electronic charts.

Some embodiments provide a system for retrieving and displaying electronic charts onboard an aircraft. The system includes a memory element, configured to store a database of electronic charts; a speech recognition (SR) interface, configured to receive and interpret a set of speech data; a global positioning system (GPS), configured to provide location data for the aircraft; a display element, configured to present each of the electronic charts; and a processor architecture, configured to: analyze the set of speech data transmitted by the SR interface; select at least one electronic chart from the database, based on the analysis of the set of speech data and the location data transmitted by the GPS; and communicate the selected at least one electronic chart to the display element for presentation to a user.

Some embodiments provide a system for retrieving electronic charts stored in a database, the system comprising: a speech recognition module, configured to receive a set of speech data via user interface and to interpret the received set of speech data; a location data module, configured to receive global positioning information for the aircraft; a chart retrieval module, configured to retrieve at least one of the electronic charts based on the interpreted set of speech data and the received global positioning information; and a chart display module, configured to present the at least one of the retrieved electronic charts, via an aircraft display, to a user.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for storage, time-efficient access, and display of electronic charts onboard an aircraft. Specific content is related to voice-control architecture for accessing a group of electronic charts, and the automatic integration of specific electronic charts based on a geographic location of the aircraft, a programmed route for the aircraft, user profile information for a flight crew member, and user preferences which may be incorporated on the fly. Commands are received using speech recognition (SR) technology, and operations relating to the display of electronic charts are performed based on this received speech data.

For purposes of this application, electronic charts may include airport maps, sectional charts, high and low airways, intersections and taxiways data, and procedures and data associated with approach, arrival, and departure, and other data necessary for flight crew members to initiate and perform flight operations for an aircraft. Electronic charts may further include sectional maps, high altitude jetways, low altitude airways, and additional procedures (e.g., go around, missed approach, hold, etc.).

Figure 1:
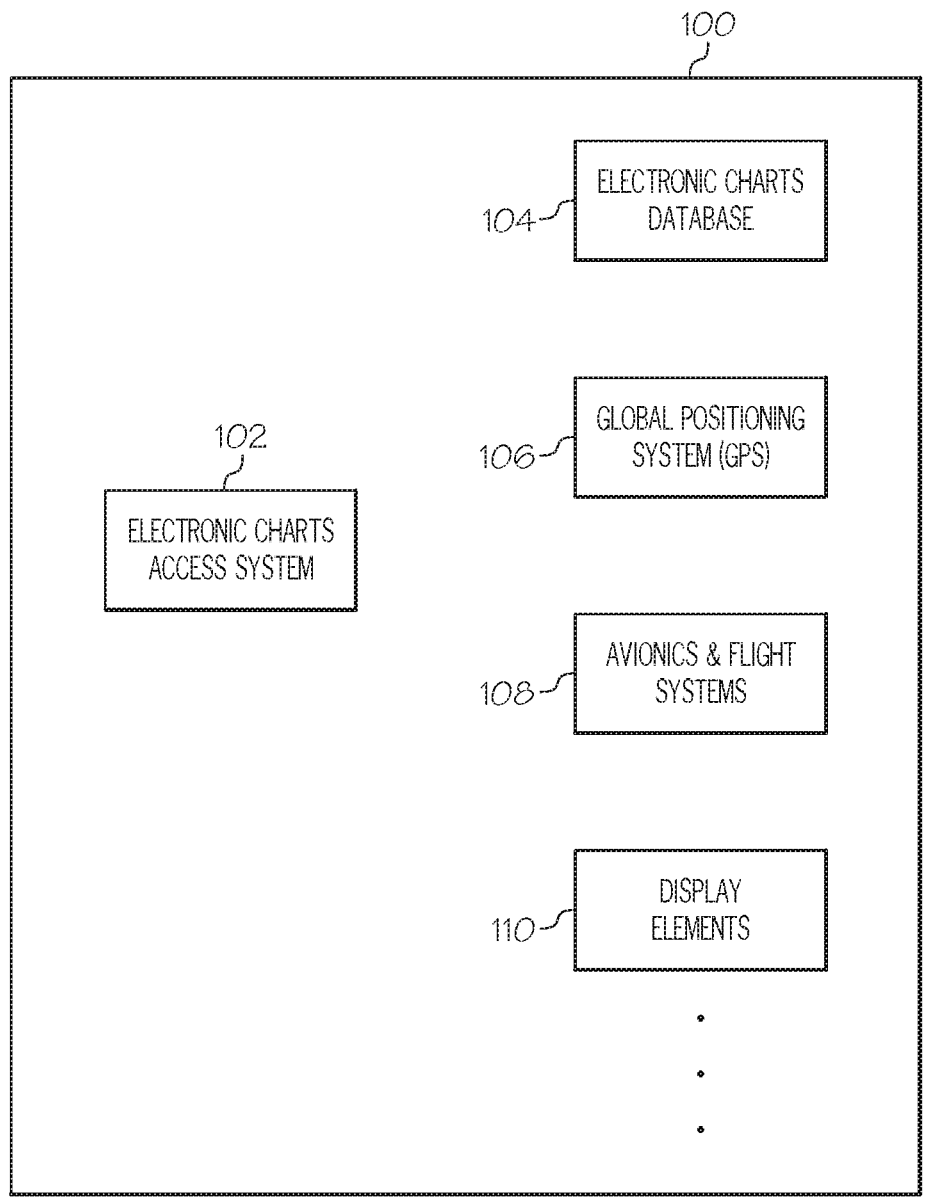
FIG. 1 is a schematic representation of an embodiment of an aircraft utilizing an electronic charts access system.

Turning now to the figures, FIG. 1 is a schematic representation of an embodiment of an aircraft 100 utilizing an electronic charts access system 102. The aircraft 100 may be any aircraft that includes speech recognition (SR) technology, as described below. The aircraft 100 may be implemented as commercial, military, or private aircraft, including but not limited to airplanes (e.g., jetliners, cargo planes, fighter jets, etc.), helicopters, seaplanes, spacecraft, or the like. As shown, the aircraft 100 may include, without limitation, an electronic charts access system 102, an electronic charts database 104, a global positioning system (GPS) 106, a plurality of avionics and flight systems 108, and at least one display element 110. The aircraft may be any aircraft that includes the avionics, aircraft systems, and modules described below, which provide the requisite aircraft status data, geographic location, access to and storage of electronic charts, and presentation of electronic charts for one or more flight crew members.

An electronic charts database 104 is generally stored locally on the aircraft 100, and includes electronic charts available for use in aeronautical applications. The electronic charts database 104 stores aeronautical charts that have been downloaded from a cloud-based application or uploaded from any form of removable media. The electronic charts may updated periodically via automatic or manually-initiated downloads, or via manual upload. Electronic charts are customarily used by flight crew members to provide aeronautical data useful for performance of flight operations. Electronic charts present information including, but not limited to: terrain, topography, airport locations, runway types and lengths, airspace types and altitude restrictions, procedural altitude minima, high and low airways, radio aids to navigation, communications frequencies, obstacle data, obstruction clearance altitudes, military training routes, navigation data, VFR and IFR airport diagrams, arrival, approach, landing, and departure procedures.

A global positioning system (GPS) 106 provides triangulated location data for the aircraft 100 and is generally implemented using a standard GPS device. However, in certain embodiments, the GPS 106 may include another device in which GPS functionality has been internally incorporated. The GPS 106 may include either (i) the ability to triangulate the location of the aircraft, or (ii) the ability to obtain the triangulated location of the aircraft, in order to provide the location data to the electronic charts access system 102 (along with other applicable systems of the aircraft 100).

Avionics and flight systems 108 may include any electronic system onboard an aircraft configured to provide aircraft status information (e.g., phase of flight, wheels up/down, etc.), aircraft route data, aircraft phase of flight data, and other aircraft-specific information used to determine one or more applicable electronic charts. Exemplary embodiments of an applicable avionics system or and flight system may include a flight management system (FMS), or other similar system.

A display element 110 may be implemented as a standard forward display, configured to display, render, or otherwise convey one or more graphical representations, synthetic displays, graphical icons, visual symbology, or images associated with operation of the host aircraft 100 on the display element 110, as described in greater detail below. The display element 110 could also be implemented as a virtual display of the type used with head up display technology. Moreover, the display element 110 could be integrated in equipment worn or carried by the user, e.g., a display mounted to eyewear, headwear, or the like. The display element may be used to view menus, text, procedures, charts, maps, and other data specific to a particular route and/or phase of flight. The display element 110 is usually located within a cockpit of the host aircraft 100. It will be appreciated that although FIG. 1 shows a single display element 110, in practice, additional display devices may be present onboard the host aircraft 100.

An electronic charts access system 102 is configured to communicate with the GPS 106 and the avionics and flight systems 108 to identify and retrieve appropriate electronic charts from the electronic charts database 104 for presentation via the display element 110. Appropriate electronic charts may include, without limitation: route-specific charts, user-selected charts, and charts that are applicable based on a current geographic location or current status of the aircraft 100. The electronic charts access system 102 includes a specialized framework for a subset of available electronic charts that are applicable to a current flight. This specialized framework is configured to provide time-efficient access to each of the applicable electronic charts during flight operations. In other words, the framework provides voice-controlled, quick-access to electronic charts that are relevant to a current flight.

Figure 2:
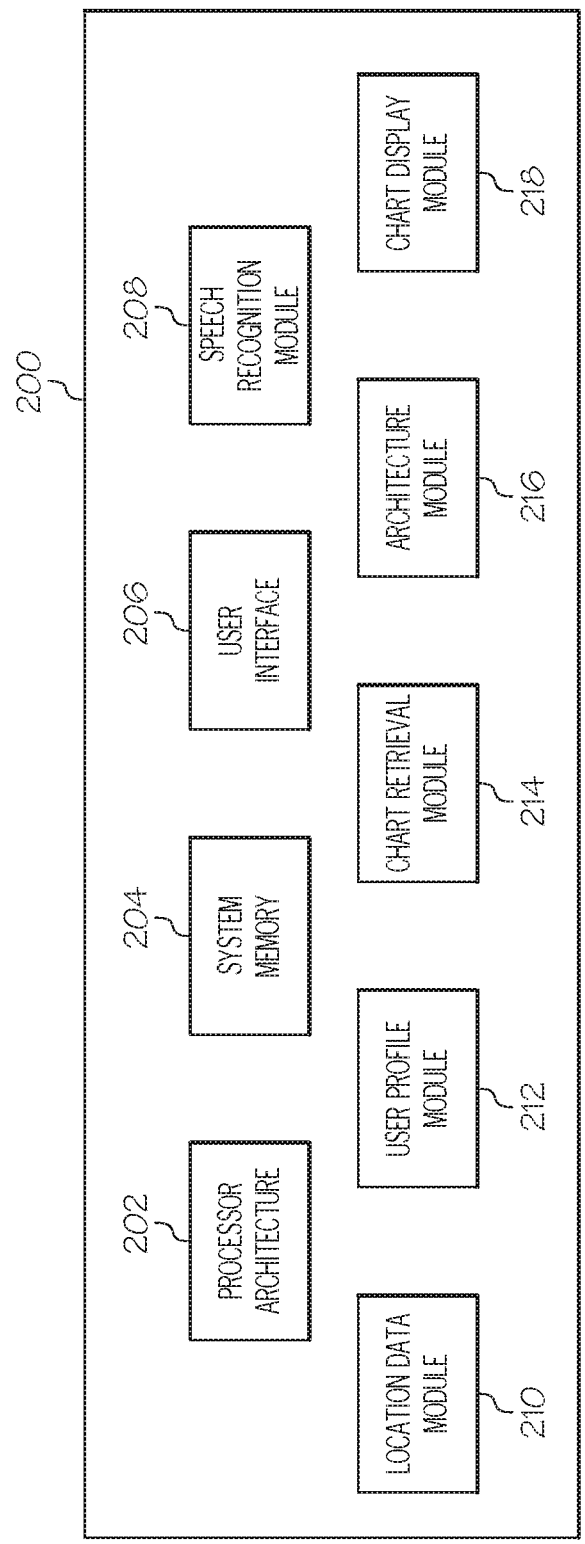
FIG. 2 is a schematic block diagram representation of an electronic charts access system, according to some embodiments.

FIG. 2 is a schematic block diagram representation of an electronic charts access system 200, according to some embodiments. It should be appreciated that the electronic charts access system 200 illustrates one embodiment of the electronic charts access system of FIG. 1 (see reference 102), including additional detail. The electronic charts access system 200 may be implemented using any desired platform. For example, the electronic charts access system 200 could be realized as any of the following, without limitation: a desktop computer, a laptop computer, a server system, a mobile device, a specialized piece of diagnostic equipment, any other device that includes a processor architecture 202, or any combination of the previously described processor-based devices.

The electronic charts access system 200 may include, without limitation: a processor architecture 202, a system memory 204, a user interface 206, a speech recognition module 208, a location data module 210, a user profile module 212, a chart retrieval module 214, an architecture module 216, and a chart display module 218. In practice, an embodiment of the electronic charts access system 200 may include additional or alternative elements and components, as desired for the particular application. For example, additional components such as displays and user input components may be employed without departing from the scope of the present disclosure. For ease of illustration and clarity, the various physical, electrical, and logical couplings and interconnections for these elements and features are not depicted in FIG. 2. Moreover, it should be appreciated that embodiments of the electronic charts access system 200 will include other elements, modules, and features that cooperate to support the desired functionality. For simplicity, FIG. 2 only depicts certain elements that relate to the electronic charts access techniques described in more detail below.

The processor architecture 202 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems.

The processor architecture 202 is in communication with system memory 204. The system memory 204 represents any non-transitory short or long term storage or other computer-readable media capable of storing programming instructions for execution on the processor architecture 202, including any sort of random access memory (RAM), read only memory (ROM), flash memory, magnetic or optical mass storage, and/or the like. It should be noted that the system memory 204 represents one suitable implementation of such computer-readable media, and alternatively or additionally, the processor architecture 202 could receive and cooperate with external computer-readable media that is realized as a portable or mobile component or application platform, e.g., a portable hard drive, a USB flash drive, an optical disc, or the like.

The illustrated embodiment of the electronic charts access system 200 includes a user interface 206, which is suitably configured to receive input from a user (e.g., a flight crew member) and, in response to user-entered data, supply appropriate command signals to the processor architecture 202. The user interface 206 may be any one, or any combination, of various known user interface devices or technologies, including, but not limited to: a computer keyboard, mouse, touch-pad, and/or trackball and screen; a touch-screen device; or the like. The user interface 206 may further be implemented using a voice recognition (VR) or speech recognition (SR) interface, such as that commonly known and used in the art to receive and interpret speech data. An SR interface may include one or more microphones or other speech input device(s) and an indicator (physical or software-implemented) to flag the beginning or end of input speech data. Moreover, the user interface 206 may cooperate with a display element (see FIG. 1, reference 110) to provide a graphical user interface. In other words, the user interface 206 could be implemented as a graphical user interface rendered on a display element. In certain embodiments, a display element implements touch-sensitive technology and/or speech recognition (SR) technology for purposes of the user interface 206. Thus, a user can manipulate the user interface 206 by moving a cursor symbol rendered on the display element, by physically interacting with the display element itself, or by articulating one or more speech commands for recognition and interpretation by the electronic charts access system 200. Using input keyboard commands, touch-screen commands, or speech commands (among other types of input commands), the user could manipulate the user interface 206 to enter user profile information or selections of electronic charts into the electronic charts access system 200.

The speech recognition module 208 is configured to receive speech data from the user interface 206 and to apply speech recognition algorithms to interpret the received speech data. The speech recognition module 208 may utilize commonly known and used speech recognition techniques to determine words or phrases uttered by a user (e.g., a flight crew member) and received at the user interface 206.

The location data module 210 is configured to receive triangulated position data for a host aircraft (see FIG. 1, reference 100). In certain embodiments, the location data module 210 receives this location data from an onboard global positioning system (GPS) or other flight system(s) capable of determining a triangulated position of the aircraft. In other embodiments, the location data module 210 receives transmitted location data that is communicated from an external source. In some embodiments, however, the location data module 210 receives manually-entered position data for the aircraft from a user via the user interface 206 or from flight personnel external to the aircraft (e.g., control tower personnel).

The user profile module 212 is configured to receive user credentials from a flight crew member, and to log the flight crew member into a user-specific profile associated with the electronic charts access system 200. The user profile module 212 is further configured to receive individual, user-specific information for a flight crew member that has logged in to the system, and to provide the electronic charts access system 200 access to a registry of user-selected electronic charts associated with a user profile. In certain embodiments, the registry, or list of user-selected electronic charts, includes electronic charts that a user has "bookmarked" or placed on a "favorites" list associated with his own user profile, as described above with regard to FIG. 3. In some embodiments, the registry may include electronic charts automatically selected by the electronic charts access system 200, based on a user's selection history.

In certain embodiments, the electronic charts access system 200 may also maintain an aircraft profile, which stores data regarding the previous flights of one particular aircraft. For these embodiments, the user profile module 212 is configured to build a profile of charts commonly associated with use of the aircraft, which would become available to flight crew members logging into the electronic charts access system 200 of the specific aircraft. These embodiments support a situation where an aircraft has several flight crew members that tend to fly the same routes (e.g. commercial airlines).

Figure 3:
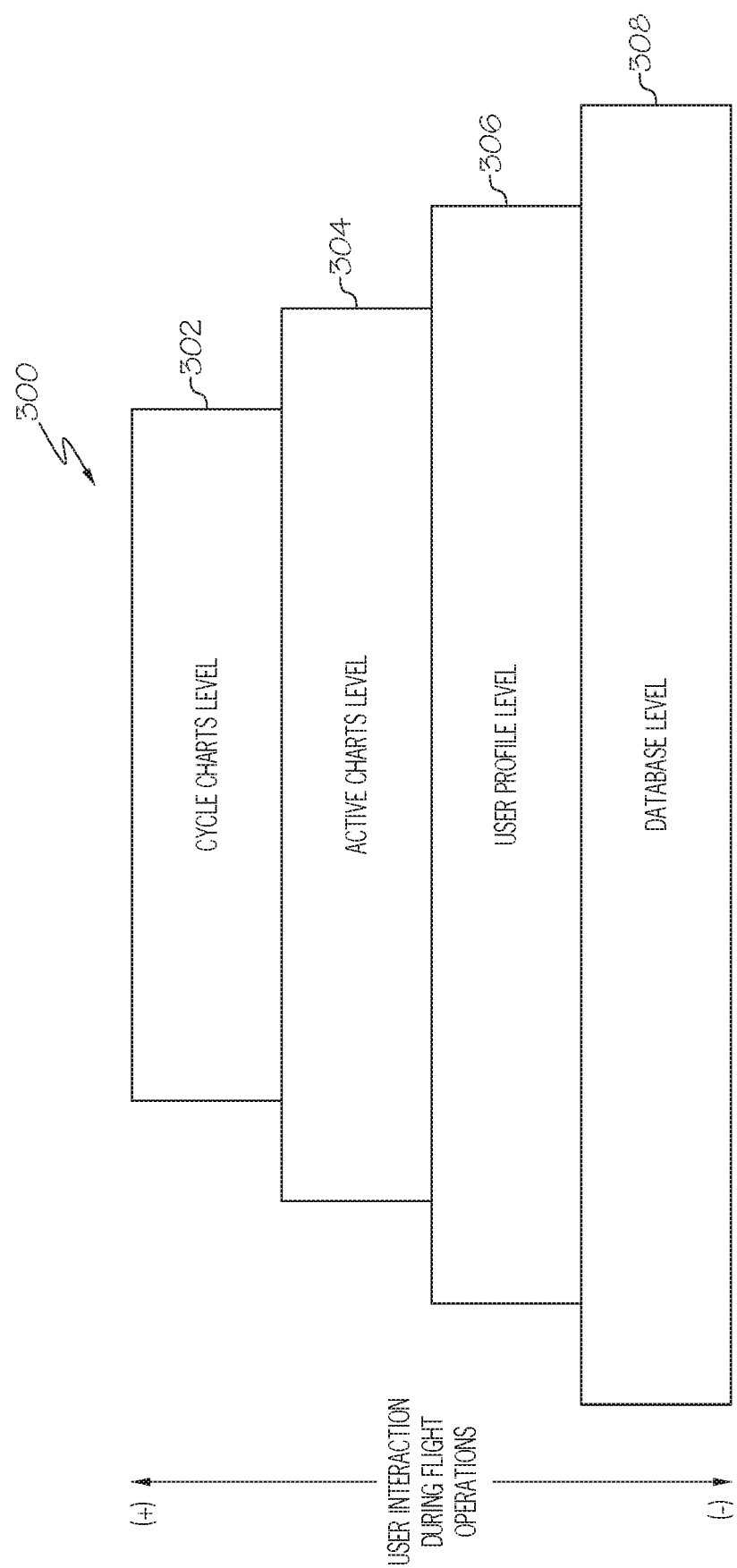
FIG. 3 is a schematic diagram representation of an architecture for use with an electronic charts access system, according to some embodiments.

The user profile module 212 is further configured to receive user input (via the user interface 206) to identify user selections of electronic charts associated with the current user profile, and to provide these user selections to the chart retrieval module 214 for use in importing bookmarked electronic charts into the active charts and/or cycle charts levels of the architecture (see FIG. 3 and related description).

The chart retrieval module 214 is configured to receive data from the speech recognition module 208 or user interface 206, the location data module 210, and the user profile module 212, to determine electronic charts indicated by data received via each of these modules, to retrieve the indicated electronic charts from the electronic charts database, and to import them into specialized architecture levels (provided by the architecture module 216) for more efficient, voice-controlled access during flight.

The architecture module 216 provides a framework for the storage and voice-controlled retrieval of electronic charts that are stored and utilized onboard an aircraft. The architecture module 216 may include multiple levels or, in other words, "sub-frameworks" to separate groups of electronic charts according to their relevance or applicability to current flight operations. An exemplary embodiment of this type of architecture is illustrated in FIG. 3, including additional detail. As shown, the database level 308 is the bottom level, and is the furthest removed (within the levels of the architecture 300) from interaction with a user during flight operations. In other words, electronic charts at the database level 308 are generally not currently being viewed or accessed, and are not immediately accessible (i.e., cannot be accessed using one procedural step or one simple selection). The database level 308 provides a framework for a complete database of electronic charts, which provide aeronautical data to flight crew members. This complete database includes all available charts which have been obtained (via download or upload) and stored locally onboard an aircraft. Thus, the database includes electronic charts applicable to any aircraft, any flight or route, any geographic location, or any aircraft status.

The user profile level 306 provides a framework for user-specific data, including a user-selected list or registry of electronic charts. Generally, the user-specific data is predetermined and stored as a compilation of preferences and information associated with one particular user, otherwise referred to as a user profile. In certain embodiments, a registry of user-selected charts (stored as part of the user profile) may be referred to as a "bookmarks" list or "favorites" list.

The active charts level 304 provides a framework for the storage and rapid, voice-controlled retrieval of electronic charts applicable to current flight operations. The "active" electronic charts are the electronic charts that will most likely be viewed by flight crew member(s) during the course of a particular flight. The active charts level 304 includes user-selected electronic charts that have been imported from the database level 308 and user profile level 306. The active charts level 304 may include any electronic chart that the user decides to import and use for a particular flight, any electronic chart that is automatically determined to be applicable to a particular flight (e.g., electronic charts that are indicated by the geographic location, en route information, flight status, etc.), and any chart selected from a set of user profile defined "favorites". Users may import charts to the active charts level at any time prior to commencement of flight operations and/or during flight operations (i.e., "on the fly" or "on demand"). The active charts level 304 has a larger capacity than the cycle charts level 302. In other words, the active charts level 304 has the capability of storing a larger number of electronic charts than the cycle charts level 302.

The cycle charts level 302 provides a framework for a subset of those charts associated with the active charts level 304, permitting a chart-toggling functionality that is not available in the other levels. The subset of charts stored in the cycle charts level 302 is limited. In certain embodiments, the subset includes four to six electronic charts. In some embodiments, the subset includes fewer than five electronic charts. In other embodiments, the subset includes ten or fewer charts. The chart toggling functionality may be activated using speech recognition (SR) commands, such as "switch chart," "next chart," or "toggle chart". It should be appreciated, however, that the chart toggling functionality may be activated using any speech command previously designated and programmed into the system for use as a chart-toggling command In some embodiments, a chart-toggling command may include commands that are not associated with SR commands Mechanisms for receiving chart-toggling commands may include, without limitation: a push-button, a touchscreen object, a clickable screen object, or a gesture (e.g., swiping a touchscreen or waving a hand in the air, perhaps in proximity to the chart display). The purpose of the cycle charts level 302 is to allow quick access (via chart-toggling) to a select few charts that a flight crew member may need to switch back and forth between, during the current flight. This is accomplished by using simple speech commands and speech recognition technology.

The chart-switching functionality essentially provides viewing access to each of the electronic charts stored in the cycle charts framework when a user articulates a particular speech command For example, a user may be viewing (via aircraft display device) a first of five electronic charts stored in the cycle charts framework. When the user utters the phrase "next chart", the next available chart is identified and presented for viewing. Each time the user says "next chart", the next available chart is identified and presented for viewing, until each electronic chart has been viewed in a particular order.

When the end of the list of electronic charts stored in the cycle charts framework has been reached, the first chart may again be accessed using the appropriate speech command (e.g., "next chart").

In exemplary embodiments, each level of the architecture 300, as it approaches increased user interaction, contains fewer charts, thereby reducing the complicated nature of extracting a particular electronic chart from a large database of all available charts, which usually includes navigating multiple menus and making multiple selections. The architecture 300 further permits more time-efficient extraction of a particular electronic chart for quick viewing.

It should be appreciated that other embodiments of an architecture 300 for use with an electronic charts access system may include additional architecture levels and/or parts to the framework, potentially providing one or more storage and extraction locations for additional electronic charts not described here, without diminishing the core functionality of the framework described herein.

Returning to FIG. 2, the chart display module 218 is configured to coordinate with one or more aircraft displays to present electronic charts to a user. At the user's request, the chart display module 218 retrieves an electronic chart from the architecture module 216 for presentation via display element (see FIG. 1, reference 110). The chart display module 218 is further configured to coordinate with the speech recognition module 208 and the architecture module 216 to provide a "toggle-charts" functionality for the electronic charts access system 200. In this example, the chart display module 218 is configured to receive interpreted speech data from the speech recognition module 208, including particular speech commands indicating that a change in the displayed electronic chart is necessary. Once these particular speech command(s) are received, the chart display module 218 is configured to communicate with the architecture module 216 to retrieve the next electronic chart (of a designated "toggling" set of electronic charts), and to transmit the retrieved electronic chart to a display element for presentation to the user.

In practice, the speech recognition module 208, the location data module 210, the user profile module 212, the chart retrieval module 214, the architecture module 216, and/or the chart display module 218, may be implemented with (or cooperate with) the processor architecture 202 to perform at least some of the functions and operations described in more detail herein. In this regard, the speech recognition module 208, the location data module 210, the user profile module 212, the chart retrieval module 214, the architecture module 216, and/or the chart display module 218, may be realized as suitably written processing logic, application program code, or the like.

Figure 4:
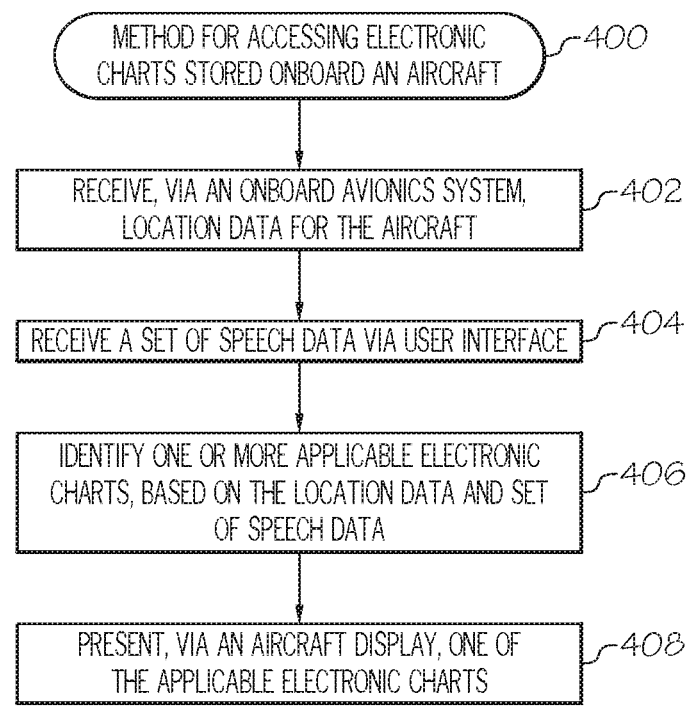
FIG. 4 is a flow chart that illustrates an embodiment of a process for accessing electronic charts stored onboard an aircraft.

FIG. 4 is a flow chart that illustrates an embodiment of a process 400 for accessing electronic charts stored onboard an aircraft. First, the process 400 begins by receiving, via an onboard avionics system, location data for the aircraft (step 402). In certain embodiments, location data may include triangulated data compatible with a global positioning system (GPS). In some embodiments, however, location data may be derived from ground-based beacons, an inertial measurement system, or the like.

Next, the process 400 receives a set of speech data via a user interface (step 404). Received speech data may include a user command to access a particular electronic chart, and in some embodiments, the user command includes an assigned name or other identifier of the electronic chart. In certain embodiments, received speech data may include an indication of an electronic chart associated with a currently presented electronic chart, such as a missed approach procedure or takeoff abort. For example, if an arrival chart is presented, a flight crew member may articulate the phrase, "show missed approach", and the process 400 would recognize the approach chart associated with the currently displayed arrival chart. Received speech data may further comprise current route data for the aircraft, indicating the applicability of electronic charts associated with the current route (e.g., route-specific electronic charts). Alternatively, received speech data may include commands to toggle between a predetermined, smaller set of electronic charts.

After receiving the set of speech data (step 404), the process 400 identifies one or more applicable electronic charts, based on the location data and the received set of speech data (step 406). Specific electronic charts may be indicated by the location of the aircraft. For example, an aircraft may be within a predetermined range or distance from a particular airport, indicating the applicability of a group of electronic charts associated with that airport. As another example, if the airport is small, there may be only one or two electronic charts associated with it. Based upon the direction of travel, one may be more appropriate. If the received set of speech data includes the phrase, "Airport Chart", the process 400 identifies the chart for the current airport and possibly the approach based upon the direction of approach to the airport. In another example, the aircraft may be within a predetermined range of several airports, wherein all electronic charts associated with all of the surrounding airports are applicable, based on the location of the aircraft.

The process 400 interprets the received set of speech data using a speech recognition algorithm to produce an interpretation result, and compares the interpretation result to a stored database of electronic charts to obtain a comparison result. This comparison result may identify one or more matching results between an identifier of a stored electronic chart and the received set of speech data. When at least one matching result is located, then the process 400 may retrieve electronic charts associated with the matching result from a database of electronic charts or a set of "active" electronic charts that have been designated as applicable to current flight operations. In certain embodiments, the received set of speech data may include selections from among the electronic charts indicated by the location data. In some embodiments, the received set of speech data may indicate selections of one or more electronic charts outside of the group of electronic charts indicated by the location data, thereby increasing the number of electronic charts available for voice-controlled access during current flight operations.

Then the process 400 presents, via an aircraft display, one of the applicable electronic charts (step 408). The received set of speech data may request a selection of a particular electronic chart for display. In this case, the process 400 presents the individual electronic chart via a corresponding aircraft display. In certain embodiments, the received set of speech data may request more than one electronic chart for display. For example, the received set of speech data may include the phrase, "Load all charts for Reno airport." The process 400 would then retrieve electronic charts associated with the airport, taxiway map, approaches, and departures for that airport, and import these electronic charts into a cycle charts level or active charts level (i.e., the toggle-charts list or the active charts list). A flight crew member could then use appropriate identifiers and/or toggle-chart commands to cycle through the imported set of electronic charts. Alternatively, the user could articulate the phrase, "Show Reno airport, Chili three approach, and taxiway map." The three electronic charts would be retrieved and imported into the cycle charts level (i.e., the toggle charts set), allowing for quick access to each.

Figure 5:
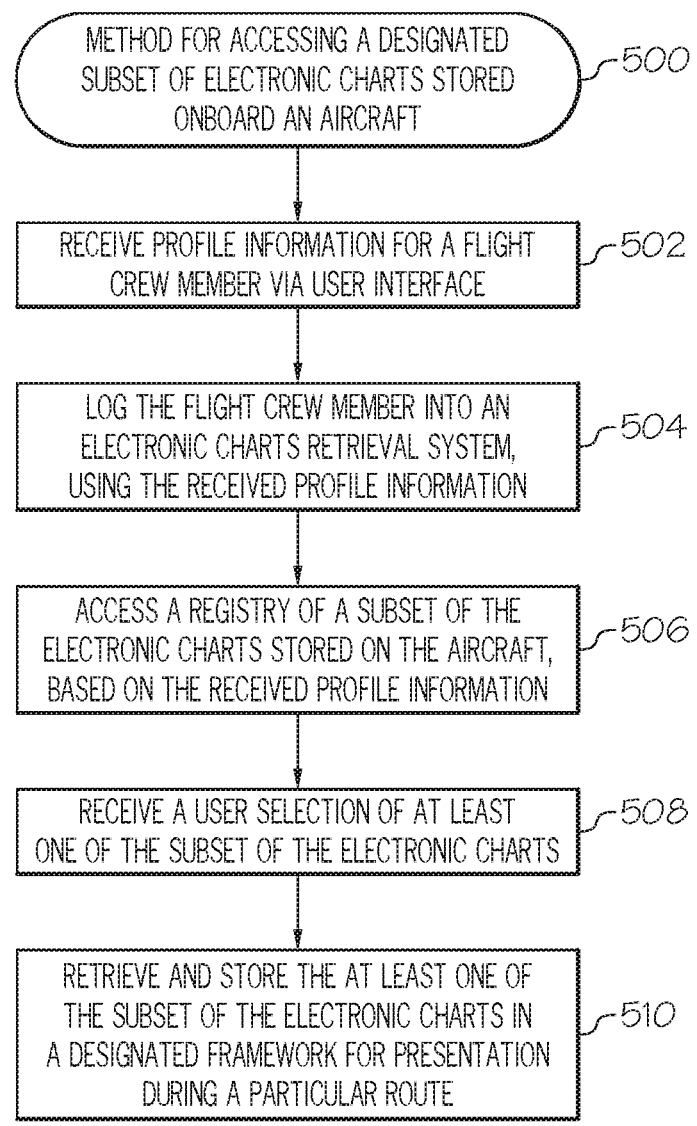
FIG. 5 is a flow chart that illustrates an embodiment of a process for accessing a designated subset of electronic charts stored onboard an aircraft.

FIG. 5 is a flow chart that illustrates an embodiment of a process 500 for accessing a designated subset of electronic charts stored onboard an aircraft, wherein the designated subset includes user-selected electronic charts that have been "bookmarked" for frequent use. First, the process 500 receives profile information for a flight crew member via a user interface (step 502), and the process 500 logs the flight crew member into an electronic charts retrieval system using the received profile information (step 504). Generally, the user logs in, in a manner similar to logging into any well-known interface that includes data specific to a particular user account (e.g., email accounts, social media accounts, or the like). In certain embodiments, profile information for logging into the system may include a user identifier, a password, or other login credentials.

After logging the user into the system (step 504), the process 500 accesses a registry of a subset of the electronic charts stored on the aircraft, based on the received profile information (step 506). The subset of the electronic charts stored on the aircraft includes at least one of the electronic charts from the complete database of electronic charts. Although the subset may include any number of electronic charts, up to and including all of the electronic charts in the database, exemplary embodiments of the process 500 select a group of electronic charts that is smaller than the complete database. Once the user has logged in, a saved list or registry of the user's preferred electronic charts are available to the system for further use. The registry of a subset of the electronic charts may include a list of designated (i.e., "bookmarked," "saved," or "favorite") electronic charts for the particular user. Generally, the user will bookmark just a few of the available electronic charts that are of particular interest to the user, providing a "quick link" to a few preferred electronic charts. The registry is a list of bookmarked electronic charts that a particular user selects for purposes of quick and efficient access, similar to bookmarking internet websites for quick and easy reference and repeated access. The registry is linked to the user profile, and is not associated with any particular route, geographic location, aircraft status, or any other information. In certain embodiments, the user may save a subset of the list of designated electronic charts under a specific name for quick access to that subset. For example, the user may save a set of preferred electronic charts associated with a frequently visited airport, such as the Albertville airport (e.g. "Show My Albertville Charts"). The user would have previously identified a set of charts that would, as a set, be named "My Albertville Charts".

Generally, the registry is usually created prior to the commencement of flight operations, but in certain embodiments the user may edit the registry (e.g., add to or delete from the registry) on an as-needed basis. Additionally, the registry may be automatically populated based on prior user selections.

Next, the process 500 receives a user selection of at least one of the subset of the electronic charts (step 508). After accessing the registry of bookmarked electronic charts, the user selects one or more of the charts from the favorites list for use during current flight operations. Essentially, the user chooses certain bookmarked electronic charts to incorporate into a system for rapid, voice-controlled access during the flight. The process 500 then retrieves and stores the at least one of the subset of the electronic charts in a designated framework for presentation during a particular route (step 510). In certain embodiments, the process 500 retrieves the selected electronic charts from an electronic chart database stored onboard the aircraft. In some embodiments, however, the process 500 may retrieve the selected electronic charts from a remote server or other storage location, using available communication protocols and capabilities of the hardware on the aircraft.

A flight crew member assigned to travel a designated route in an aircraft may prefer to use a particular electronic chart (or version of a particular electronic chart) during the flight. Here, the flight crew member may select one of his bookmarked charts so that the process 500 can import the selected electronic chart into a framework that provides quick, efficient access to the electronic chart throughout flight operations, without requiring the flight crew member to navigate through a multitude of unnecessary and cumbersome menus to locate and select the electronic chart for viewing. Exemplary embodiments of this type of rapid-access framework may include an active charts framework and/or a cycle charts framework, described above with regard to FIG. 3. Once the process 500 has imported an electronic chart into the designated framework, the electronic chart is available for voice-controlled access and presentation to the user during flight operations. When the user utters a speech command to select the electronic chart for presentation, the process 500 retrieves the electronic chart from the designated framework in a manner that is more rapid and efficient than the initial retrieval from the more sizable database of electronic charts.

Figure 6:
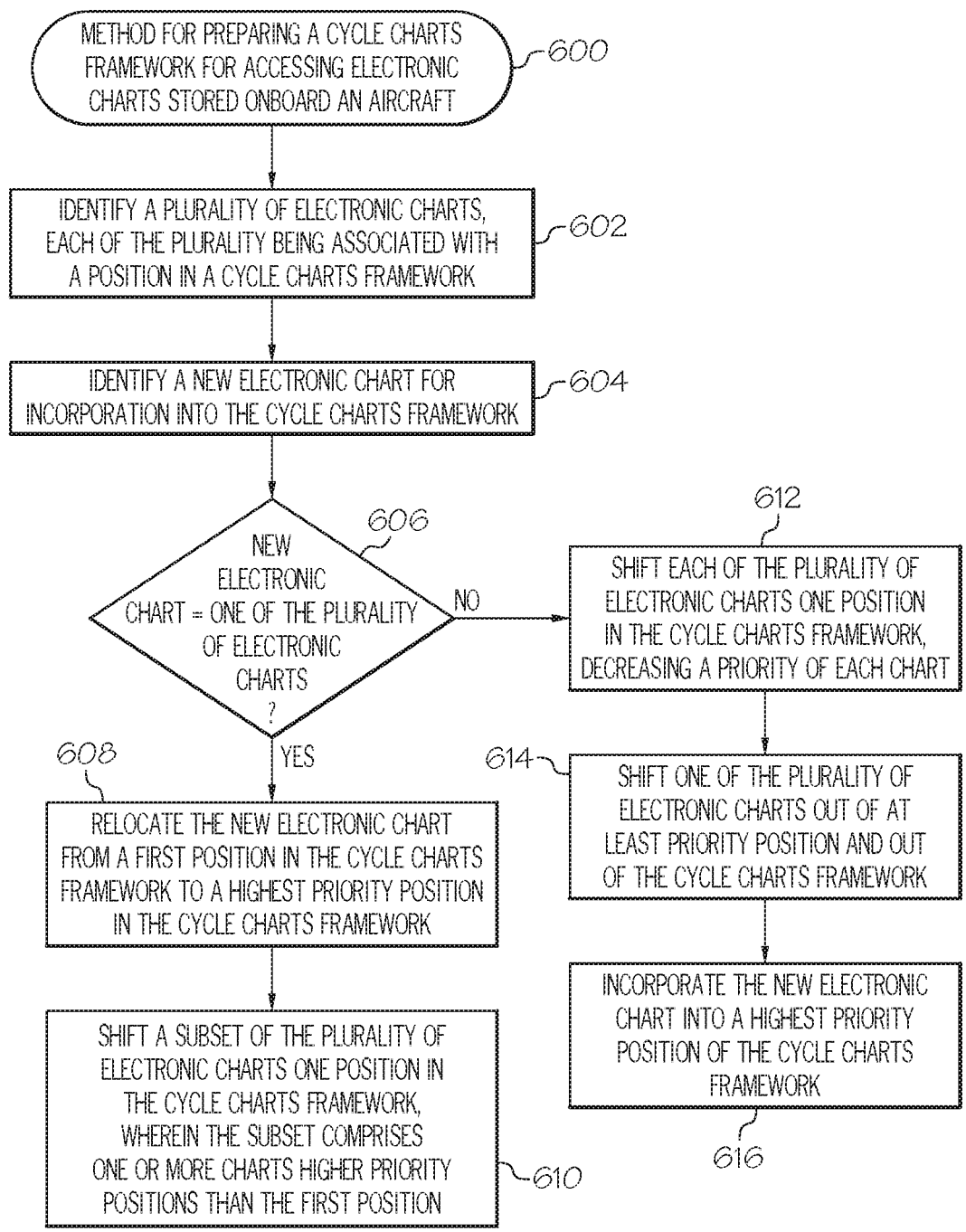
FIG. 6 is a flow chart that illustrates an embodiment of a process for preparing a cycle charts framework for accessing electronic charts stored onboard an aircraft.

FIG. 6 is a flow chart that illustrates an embodiment of a process 600 for preparing a cycle charts framework for accessing electronic charts stored onboard an aircraft. An embodiment of a cycle charts framework is described above with regard to the architecture diagram illustrated in FIG. 3. As described previously, the cycle charts framework provides a chart-switching (i.e., chart-toggling) functionality between each of a small group of selected electronic charts, when a specified speech command is received. Here, the process 600 is used to prepare the cycle charts framework for use during a particular flight.

First, the process 600 identifies a plurality of electronic charts, each of the plurality of electronic charts being associated with a position in a cycle charts framework (step 602). The identified plurality of electronic charts includes all electronic charts currently stored in the cycle charts framework. Each of these identified charts may be accessed via chart-switching functionality presented by the cycle charts framework.

Next, the process 600 identifies a new electronic chart for incorporation into the cycle charts framework (step 604). The newly-identified electronic chart for incorporation into the cycle charts framework may include, any user-selected chart, whether or not the electronic chart has been retrieved and viewed, or the most recently viewed electronic chart, regardless of the method of retrieval and/or the location from which the electronic chart has been retrieved.

The process 600 then determines whether the new electronic chart is one of the existing electronic charts that are already part of the cycle charts framework (step 606). The process 600 compares the user-selected or most recently viewed electronic chart to the electronic charts that are part of the cycle charts framework. If the new electronic chart matches one of the electronic charts in the cycle-charts framework, then the process 600 determines that the selected electronic chart is already located in the cycle charts framework (the "Yes" branch of step 606). When the new electronic chart is already located in the cycle charts framework, there is no need to transition the chart into the cycle charts framework from another location (e.g., the active charts framework or a complete database of electronic charts). However, the priority or location within the cycle charts framework requires adjustment, based on the selection of the new electronic chart. The process 600 relocates the new electronic chart from a first position (i.e., the existing position of the new electronic chart) in the cycle charts framework to a highest priority position in the cycle charts framework (step 608). The highest priority position is the position of the most recently viewed chart, which is the current position of a viewable electronic chart, via onboard electronic chart display. Then the process 600 shifts a subset of the plurality of electronic charts one position in the cycle charts framework, wherein the subset comprises one or more electronic charts in higher priority positions than the first position (step 610). An embodiment of this concept is illustrated in FIG. 7, including more detail.

Figure 7:
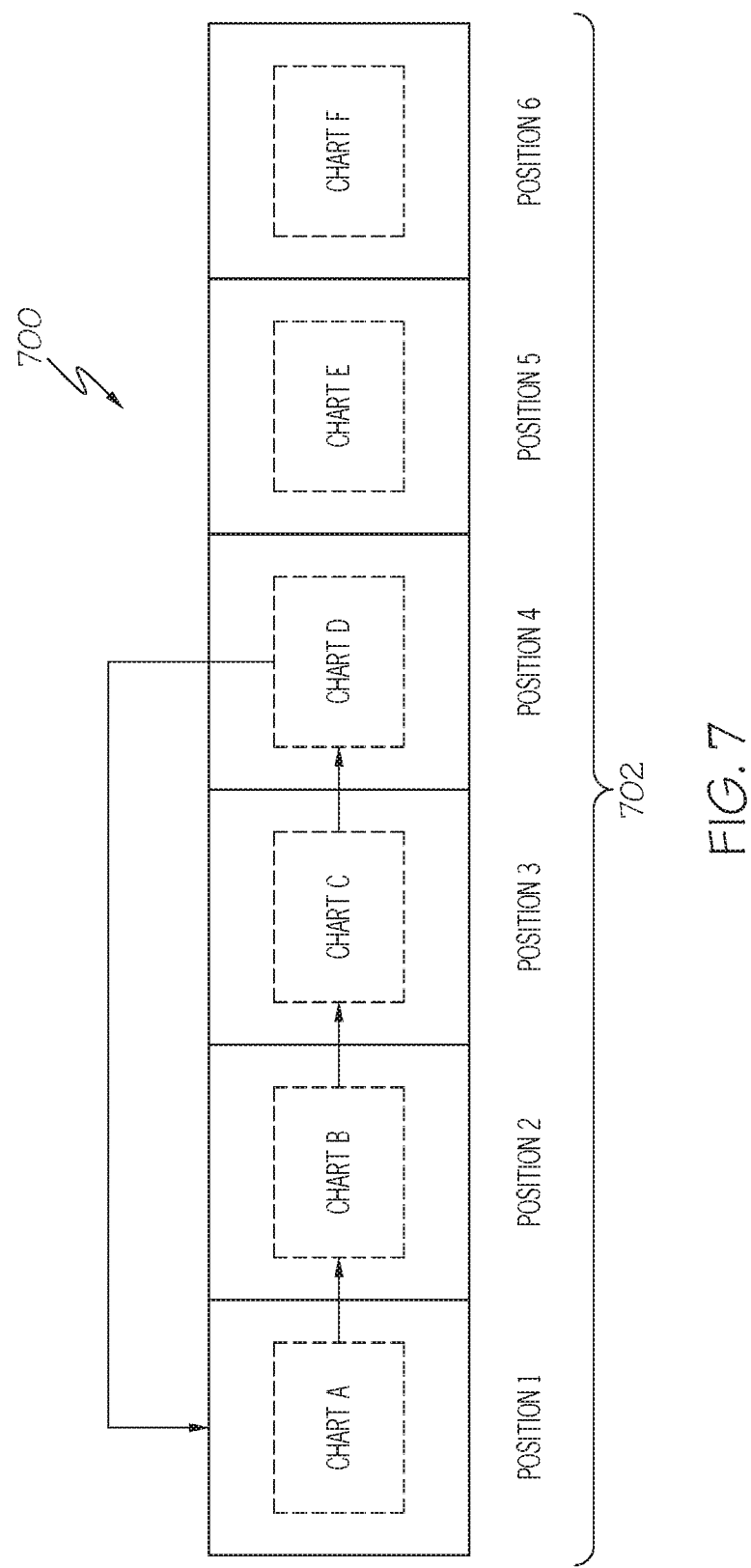
FIG. 7 is a schematic diagram representation of a cycle charts framework, according to some embodiments.

FIG. 7 is a schematic diagram representation of a cycle charts framework 700, according to some embodiments. In the embodiment shown, the cycle charts framework 700 includes six positions 702 (Positions 1-6) at which an electronic chart may reside. Each of the electronic charts (Charts A-F) occupy one of the available positions. Although in this particular embodiment, there are six available positions for electronic charts, indicating that a maximum of six electronic charts may reside in the cycle charts framework 700, other embodiments may provide fewer or greater numbers of available positions, thereby permitting fewer or greater numbers of electronic charts to reside in the cycle charts framework 700.

Each position represents an assigned priority for an electronic chart in the cycle charts framework 700, and electronic charts are moved between positions (or out of the cycle charts framework 700 completely) to reflect changes in that priority. As shown, Chart D is a selected, or newly-identified, electronic chart. Once Chart D has been selected, it is moved from its current position (e.g., Position 4) to the position of highest priority in the cycle charts framework 700. As indicated by the arrows, the movement of Chart D from Position 4 to Position 1 requires that the other electronic charts, which previously held higher priority than Chart D, are moved down in both position and priority, in order to accommodate the increase in position and priority for Chart D. Chart A, which resided in Position 1, is moved to Position 2. Chart B is moved from Position 2 to Position 3. Chart C is moved from Position 3 to the newly-vacated Position 4. Chart E and Chart F remain in their current positions of lower priority than the original position at which Chart D resided, which is Position 4. As illustrated in FIG. 7, when a new electronic chart is selected from among the existing electronic charts in the cycle charts framework 700, there is a shift in priority and position for only those electronic charts associated with a higher priority than the selected electronic chart itself.

Returning now to FIG. 6, if the new electronic chart does not match one of the electronic charts in the cycle-charts framework, then the process 600 determines that the selected electronic chart is not already located in the cycle charts framework (the "No branch of step 606). The process 600 then shifts each of the plurality of electronic charts one position in the cycle charts framework, thereby decreasing the priority of each electronic chart (step 612), shifts one of the plurality of electronic charts out of a least priority position and out of the cycle charts framework (step 614), and incorporates the new electronic chart into a highest priority position of the cycle charts framework (step 616). Electronic chart priority by be determined by how long the chart has been active in the current flight, or it may be based upon distance from the current location. In either case, the lowest priority chart could get dropped off the toggle list if there is not enough room. An embodiment of this concept is illustrated in FIG. 8, including more detail.

Figure 8:
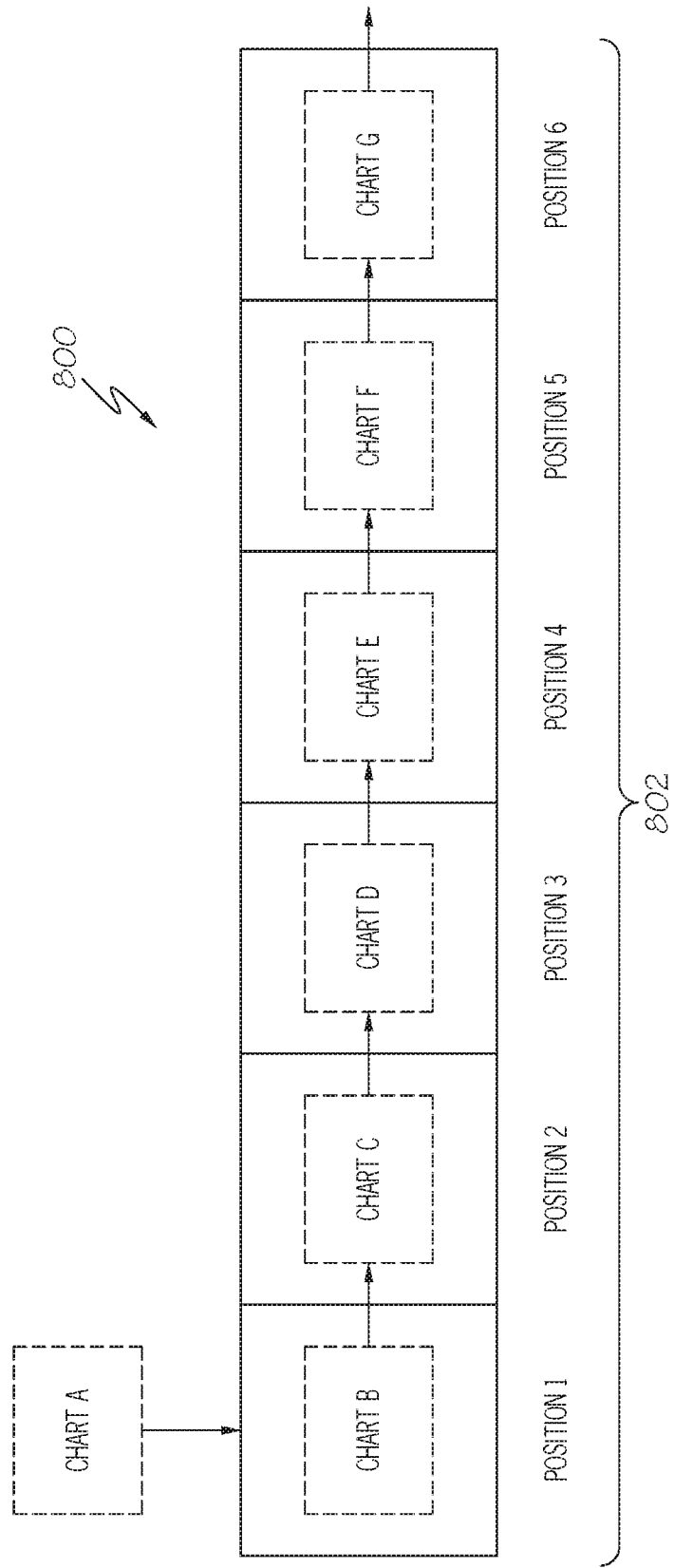
FIG. 8 is another schematic diagram representation of a cycle charts framework, according to some embodiments.

FIG. 8 is another schematic diagram representation of a cycle charts framework 800, according to some embodiments. In the embodiment shown, the cycle charts framework 800 includes six positions 802 (Positions 1-6) at which an electronic chart may reside. Each of the electronic charts (Charts A-F) occupy one of the available positions. Although this particular embodiment illustrates a maximum of six available positions for electronic charts, other embodiments may provide fewer or greater numbers of available positions in the cycle charts framework 800.

Each position represents an assigned priority for an electronic chart in the cycle charts framework 800, and electronic charts are moved between positions (or out of the cycle charts framework 800 completely) to reflect changes in that priority. Here, Position 1 reflects the highest priority position for an electronic chart, and Position 6 reflects the lowest priority position for an electronic chart. As shown, Chart A is a selected, or newly-identified, electronic chart. Once Chart A has been selected, it is incorporated into the position of highest priority (e.g., Position 1) in the cycle charts framework 800. As indicated by the arrows, the incorporation of Chart A into the cycle charts framework 800 requires shifting the positions of the other electronic charts, effectively moving each of the electronic charts downward in both position and priority. Chart B, which resided in Position 1, is moved to Position 2. Chart C is moved from Position 2 to Position 3. Chart D is moved from Position 3 to Position 4. Chart E is moved from Position 4 to Position 5. Chart F is moved from Position 5 to Position 6. However, because there is no lower-priority position for Chart G to move, once downgraded in priority from Position 6, Chart G is simply moved out of the cycle charts framework 800. As illustrated in FIG. 8, when a new electronic chart is incorporated into the cycle charts framework 800, there is a shift in priority and position for all electronic charts currently located in the cycle charts framework, and the electronic chart associated with the lowest priority position is simply moved out of the cycle charts framework 800. Movement out of the cycle charts framework 800 prevents an electronic chart (in this case, Chart G) from accessibility using the chart-toggling functionality described above with regard to FIG. 3.

Figure 9:
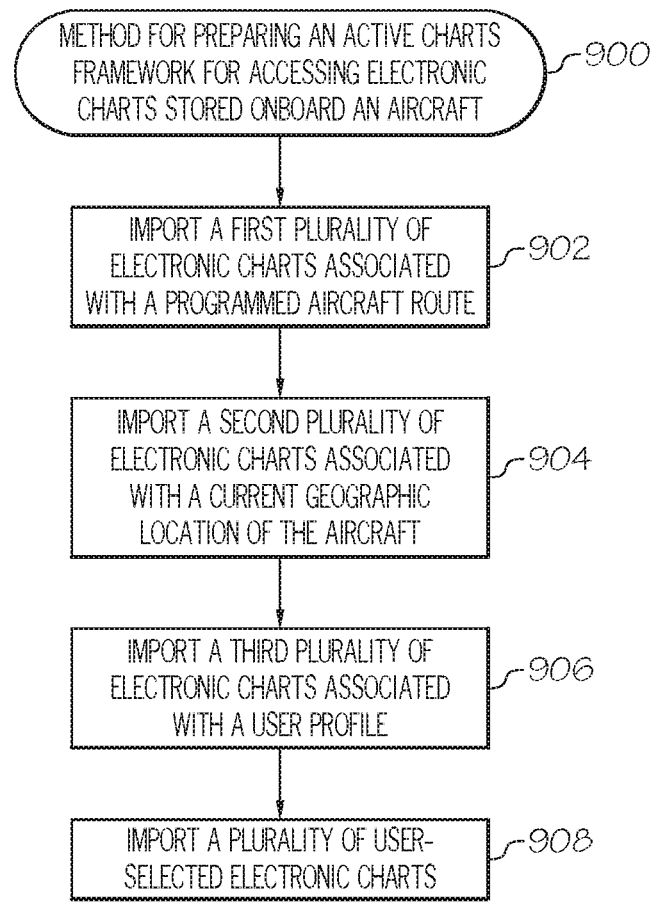
FIG. 9 is a flow chart that illustrates an embodiment of a process for preparing an active charts framework for accessing electronic charts stored onboard an aircraft.

FIG. 9 is a flow chart that illustrates an embodiment of a process 900 for preparing an active charts framework for accessing electronic charts stored onboard an aircraft. An embodiment of an active charts framework is described above with regard to the architecture diagram illustrated in FIG. 3. As described previously, the active charts framework provides a location for storage and voice-controlled retrieval of electronic charts applicable to a particular flight, based on several factors. Users may retrieve electronic charts stored in the active charts framework, using one or more speech commands, without navigating complicated menu-selections during flight operations. Here, the process 900 is used to prepare the active charts framework for use during a particular flight.

First, the process 900 imports a first plurality of electronic charts associated with a programmed aircraft route (step 902). Each aircraft route is associated, at minimum, with a departure airport and an arrival airport. Electronic charts associated with an airport may include an airport map, arrivals, departures, missed approach, emergency procedures, holds, taxiway map, etc. The process 900 deems electronic charts associated with each of these airports "applicable" to the programmed aircraft route, and imports these electronic charts into the active charts framework for the upcoming flight.

Next, the process 900 imports a second plurality of electronic charts associated with a current geographic location of the aircraft (step 904). The geographic location of the aircraft indicates whether certain electronic charts may be included as necessary for upcoming flight operations. For example, if the process 900 determines that the aircraft has already successfully taken off and has left the departure airport for a current programmed flight, then the process 900 may determine that electronic charts for the departure airport are unnecessary for current flight operations, and not include them when importing charts into the active charts framework. Alternatively, geographic location of the aircraft may indicate the nearest airport, which is a feature that flight crew members commonly use in menu searches. Here, the process 900 may determine and import electronic charts associated with the nearest airport, based on the current geographic location.

The process 900 then imports a third plurality of electronic charts associated with a user profile (step 906). Certain electronic charts may be associated with a particular user profile, indicating a user preference to use those charts on an ongoing basis. When a user has logged in using his or her credentials, the process 900 determines whether there are user-selected electronic charts associated with those login credentials, and when this is the case, the process 900 imports one or more of the user-selected charts into the active charts framework. This step allows a flight crew member to access his or her preferred charts, independent of the aircraft being used, programmed flight information, or current flight operations.

The process 900 also imports a plurality of user-selected electronic charts (step 908). The process 900 allows the user to select any electronic chart, from the database of electronic charts, for import into the active charts framework for use during a current flight. Such user selections do not require a previous designation for an electronic chart associated with a user profile, previous viewing at a cycle charts level, an indication of applicability based on geographic location or programmed flight data, or the like. Here, a user may select any electronic chart, without restriction, and incorporate that chart into the active charts framework.

The various tasks performed in connection with processes 400-600 and 900 may be performed by software, hardware, firmware, or any combination thereof. For illustrative purposes, the following description of processes 400-600 and 900 may refer to elements mentioned above in connection with FIGS. 1-3. In practice, portions of processes 400-600 and 900 may be performed by different elements of the described system. It should be appreciated that processes 400-600 and 900 may include any number of additional or alternative tasks, the tasks shown in FIGS. 4-6 and 9 need not be performed in the illustrated order, and processes 400-600 and 900 may be incorporated into a more comprehensive procedure or process having additional functionality not described in detail herein. Moreover, one or more of the tasks shown in FIGS. 4-6 and 9 could be omitted from an embodiment of the processes 400-600 and 900, as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for accessing electronic charts stored on an aircraft, the method comprising:
   receiving, via an onboard avionics system, location data for the aircraft;
   receiving a set of speech data via a user interface of the aircraft;
   identifying one or more applicable electronic charts, based on the received location data and the received set of speech data, wherein the electronic charts stored on the aircraft comprise at least the one or more applicable electronic charts;

storing the one or more applicable electronic charts into an electronic charts architecture comprising a plurality of locations for efficient electronic chart access, wherein the plurality of locations comprises:

a database level, configured to provide a database framework for a complete database of the electronic charts stored on the aircraft, wherein the complete database of the electronic charts comprises the one or more applicable electronic charts; and a cycle charts level, configured to provide a cycle charts framework for toggling a subset of the electronic charts stored on the aircraft; and presenting, via an aircraft display, a first one of the one or more applicable electronic charts, by retrieving the one or more applicable electronic charts from the electronic charts architecture.

2. The method of claim 1, wherein the identifying step further comprises:

interpreting the set of speech data using a speech recognition algorithm to produce an interpretation result; and comparing the interpretation result to a stored database of the electronic charts to obtain a comparison result, wherein the complete database comprises the stored database;

wherein the comparison result comprises the one or more applicable electronic charts.

3. The method of claim 1, wherein receiving the set of speech data further comprises receiving current route data via the user interface; and wherein the one or more applicable electronic charts comprises a set of route-specific electronic charts.

4. The method of claim 1, wherein the plurality of locations further comprises:

an active charts level, configured to provide an active charts framework for storage and rapid voice-controlled retrieval of the electronic charts applicable to current flight operations; and wherein the method further comprises:

receiving a second set of speech data via the user interface, the second set of speech data requesting one of the electronic charts applicable to current flight operations; and presenting the one of the electronic charts, in response to receiving the second set of speech data.

5. The method of claim 4, wherein the plurality of locations further comprises a user profile level, configured to provide a user profile framework for user-specific data, the framework including a user-selected registry of the electronic charts; and wherein the method further comprises:

receiving, via the user interface, profile information for a flight crew member;

logging the flight crew member into an electronic charts retrieval system for the active charts framework;

accessing a registry of a subset of the electronic charts stored on the aircraft, based on the received profile information, wherein the user-selected registry comprises the registry, and wherein the user-specific data comprises the subset;

receiving user input indicating user selections of the accessed subset; and incorporating the indicated user selections into the active charts framework, for use during a current operation of the aircraft.

6. The method of claim 5, further comprising:

receiving a second set of speech data via the user interface, the second set of speech data requesting a change to the presented first one of the one or more applicable electronic charts; and toggling the one or more applicable electronic charts based on the received second set of speech data, for presentation via the aircraft display.

7. The method of claim 1, further comprising:

storing a second subset of the one or more applicable electronic charts into the cycle charts framework, the cycle charts framework comprising a location for toggling electronic charts upon receiving a toggle command;

receiving a second set of speech data comprising the toggle command; and presenting a second one of the one or more applicable electronic charts, based on the received second set of speech data.

8. The method of claim 1, further comprising:

identifying a plurality of electronic charts, each of the plurality being associated with a position in the cycle charts framework;

identifying a new electronic chart for incorporation into the cycle charts framework;

determining whether the plurality of electronic charts comprises the new electronic chart;

when the plurality of electronic charts does not comprise the new electronic chart, then:

shifting each of the plurality of electronic charts one position in the cycle charts framework, wherein the shifting decreases a priority of each of the plurality of electronic charts;

shifting one of the plurality of electronic charts out of the cycle charts framework, wherein the one of the plurality of electronic charts occupies a least priority position of the plurality of electronic charts; and incorporating the new electronic chart into a highest priority position of the cycle charts framework.

9. The method of claim 1, further comprising:

identifying a plurality of electronic charts, each of the plurality being associated with a position in the cycle charts framework;

identifying a new electronic chart for incorporation into the cycle charts framework;

determining whether the plurality of electronic charts comprises the new electronic chart;

when the plurality of electronic charts comprises the new electronic chart, then:

relocating the new electronic chart from a first position in the cycle charts framework into the highest priority position of the cycle charts framework; and shifting a subset of the plurality of electronic charts one position in the cycle charts framework, wherein the subset comprises one or more charts in higher priority positions than the first position, and wherein the shifting decreases a priority of each of the plurality of electronic charts.

10. A system for retrieving and displaying electronic charts onboard an aircraft, the system comprising:

a memory element, configured to store a database of electronic charts;

a speech recognition (SR) interface, configured to receive and interpret a set of speech data;

a global positioning system (GPS), configured to provide location data for the aircraft;
a display element, configured to present each of the electronic charts; and
a processor architecture, configured to:
analyze the set of speech data transmitted by the SR interface;
select at least one electronic chart from the database, based on the analysis of the set of speech data and the location data transmitted by the GPS;
storing the one or more applicable electronic charts into an active charts framework, the active charts framework comprising a location for efficient electronic chart access, wherein the active charts framework further comprises:
a database level, configured to provide a database framework for a complete database of the electronic charts stored on the aircraft, wherein the complete database of the electronic charts comprises the one or more applicable electronic charts; and
a cycle charts level, configured to provide a cycle charts framework for toggling a subset of the electronic charts stored on the aircraft; and
communicate the selected at least one electronic chart to the display element for presentation to a user, by retrieving the one or more applicable electronic charts from the active charts framework.

11. The system of claim 10, further comprising:
a plurality of avionics, configured to provide aircraft route data;
wherein the processor architecture is further configured to select the at least one electronic chart based on the aircraft route data.

12. The system of claim 10, wherein the active charts framework further comprises an active charts level, configured to provide an active charts framework for storage and rapid voice-controlled retrieval of the electronic charts applicable to current flight operations; and
wherein the processor architecture is further configured to store the selected at least one electronic chart in the active charts framework; and
wherein the active charts framework is configured as a storage and retrieval location to provide rapid access to a limited number of the electronic charts.

13. The system of claim 10, wherein the processor architecture is further configured to:
store the selected at least one electronic chart in the cycle charts framework;
receive a second set of speech data comprising a command to toggle a currently displayed chart; and
switch the currently displayed chart to a next available chart in the cycle charts framework;
wherein the cycle charts framework is configured as a storage location to provide functionality to toggle a designated number of the electronic charts for display.

14. The system of claim 10, wherein the active charts framework further comprises a user profile level, configured to provide a user profile framework for user-specific data, the framework including a user-selected registry of the electronic charts; and
wherein the system further comprises a user interface, configured to receive login information associated with a flight crew member;
wherein the processor architecture is further configured to retrieve a list of bookmarked electronic charts from the database, the bookmarked electronic charts being associated with the received login information; and
wherein the user-selected registry comprises the list of bookmarked electronic charts.

15. The system of claim 14, wherein the processor architecture is further configured to import a subset of the bookmarked electronic charts into the active charts framework; and
wherein the active charts framework is configured as a storage location to provide rapid access to a limited number of the electronic charts.

16. The system of claim 10, wherein the active charts framework further comprises a user profile level, configured to provide a user profile framework for user-specific data, the framework including a user-selected registry of the electronic charts; and
wherein the received set of speech data further comprises login information associated with a flight crew member, wherein the login information is used to access the user profile framework for the flight crew member; and
wherein the processor architecture is further configured to retrieve a list of bookmarked electronic charts from the database, the bookmarked electronic charts being associated with the login information.

17. A non-transitory, computer-readable medium containing instructions thereon, which, when executed by a processor, perform a method comprising:
receiving location data for an aircraft, via an onboard avionics system;
receiving a set of speech data via a user interface of the aircraft;
identifying one or more applicable electronic charts, based on the received location data and the received set of speech data, wherein the electronic charts stored on the aircraft comprise at least the one or more applicable electronic charts;
storing the one or more applicable electronic charts into an electronic charts architecture comprising a plurality of locations for efficient electronic chart access, wherein the plurality of locations comprises:
a database level, configured to provide a database framework for a complete database of the electronic charts stored on the aircraft, wherein the complete database of the electronic charts comprises the one or more applicable electronic charts; and
a cycle charts level, configured to provide a cycle charts framework for toggling a subset of the electronic charts stored on the aircraft; and
presenting, via an aircraft display, a first one of the one or more applicable electronic charts, by retrieving the one or more applicable electronic charts from the electronic charts architecture;
identifying a plurality of electronic charts, each of the plurality being associated with a position in a cycle charts framework;
identifying a new electronic chart for incorporation into the cycle charts framework;
determining whether the plurality of electronic charts comprises the new electronic chart;
when the plurality of electronic charts does not comprise the new electronic chart, then:
shifting each of the plurality of electronic charts one position in the cycle charts framework, wherein the shifting decreases a priority of each of the plurality of electronic charts;
shifting one of the plurality of electronic charts out of the cycle charts framework, wherein the one of the plurality of electronic charts occupies a least priority position of the plurality of electronic charts; and incorporating the new electronic chart into a highest priority position of the cycle charts framework.

18. The non-transitory, computer-readable medium of claim 17, wherein the method further comprises:

when the plurality of electronic charts comprises the new electronic chart, then:

relocating the new electronic chart from a first position in the cycle charts framework into the highest priority position of the cycle charts framework; and shifting a subset of the plurality of electronic charts one position in the cycle charts framework, wherein the subset comprises one or more charts in higher priority positions than the first position, and wherein the shifting decreases a priority of each of the plurality of electronic charts.

19. The non-transitory, computer-readable medium of claim 17, wherein the method further comprises:

storing a second subset of the one or more applicable electronic charts into the cycle charts framework, the cycle charts framework comprising a location for toggling electronic charts upon receiving a toggle command;

receiving a second set of speech data comprising the toggle command; and presenting a second one of the one or more applicable electronic charts, based on the received second set of speech data.

20. The non-transitory, computer-readable medium of claim 17, wherein the plurality of locations comprises:

a user profile level, configured to provide a user profile framework for user-specific data, the framework including a user-selected registry of the electronic charts; and an active charts level, configured to provide an active charts framework for storage and rapid voice-controlled retrieval of the electronic charts applicable to current flight operations;

wherein the method further comprises:

receiving, via the user interface, profile information for a flight crew member;

logging the flight crew member into an electronic charts retrieval system for the active charts framework;

accessing a registry of a second subset of the electronic charts stored on the aircraft, based on the received profile information, wherein the user-selected registry comprises the registry;

receiving user input indicating user selections of the accessed subset; and incorporating the indicated user selections into the active charts framework, for use during a current operation of the aircraft.

* * * * *